July 9, 1963
G. W. YOUNGER
3,096,720
ROTARY GEAR PUMPS
Filed Jan. 2, 1962
2 Sheets-Sheet 1
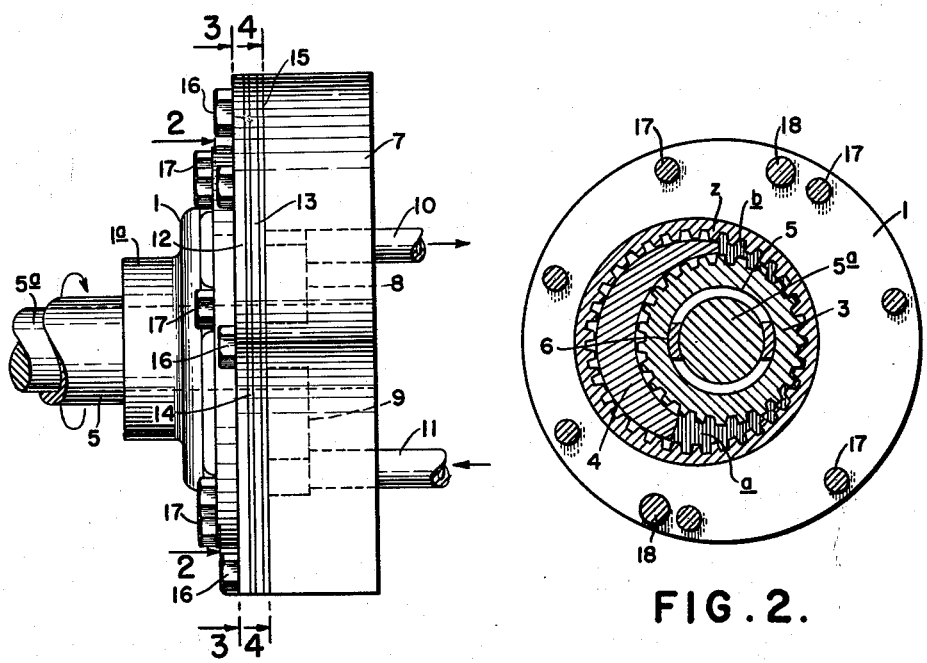
FIG.1.
FIG.2.
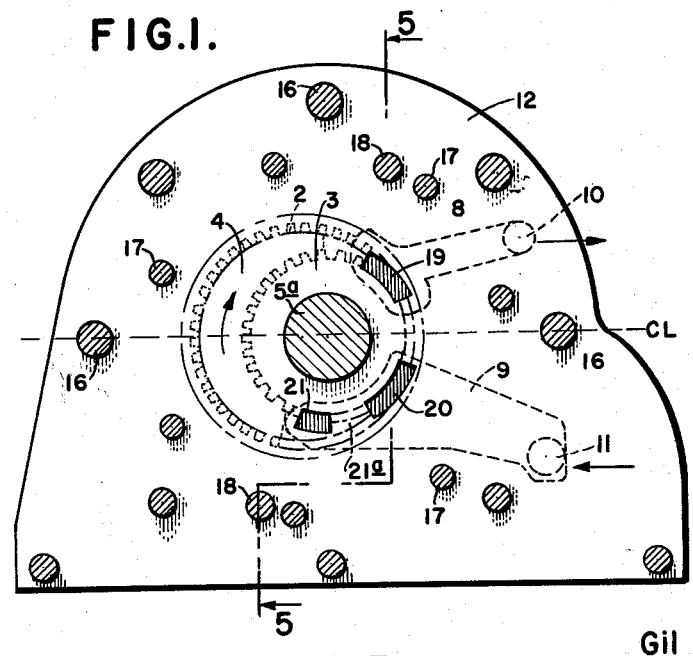
FIG.3.
INVENTOR
Gil W. Younger
BY J. Hanson Boyden,
ATTORNEY.

July 9, 1963 G. W. YOUNGER 3,096,720
ROTARY GEAR PUMPS

Filed Jan. 2, 1962 2 Sheets-Sheet 2

INVENTOR
Gil W. Younger

BY J. Hanson Boyden

ATTORNEY 3,096,720
ROTARY GEAR PUMPS
Gil W. Younger, % Mercury Tool Engineering Co., 11126 E. Rush St. S., El Monte, Calif.
Filed Jan. 2, 1962, Ser. No. 163,548
6 Claims. (Cl. 103—126)

This invention relates to rotary pump structures, and more particularly to pump structures of the internal gear type.

This type of pump comprises, as is well known, a housing in which are mounted intermeshing pinion and internal ring gears, the two gears being separated, along the area opposite their meshing point by a crescent shaped member whose inner and outer concave and convex surfaces are in running contact with the ends of the teeth of the two gears. Inlet and outlet ports and ducts are provided at opposite sides of the meshing point.

The housing is usually in the nature of a casting, having a recess in which the gears are located, the outer face of the gears and crescent shaped member lying in a plane flush with the edge of the recess, the gears being enclosed by means of a plate bolted to the casting, in which plate the inlet and outlet ports are formed, and this plate, in turn, being bolted to another casting containing ducts registering with said ports. The plate itself has also usually been fabricated as a relatively thick casting, which had to be carefully machined on both sides and in which the bolt holes had to be drilled and the ports milled out to the proper shape. This milling and machining consumed a great deal of time, with resulting high labor cost.

One object of the invention is to produce these plates much more rapidly and cheaply. To this end the invention contemplates making the plates of relatively thin sheet steel, and forming the ports and bolt holes by means of punching.

In order to provide the necessary rigidity, the invention further contemplates producing each plate by assembling two previously punched sheets face to face, with the bolt holes and ports in registry, and with a similarly punched gasket of soft or fibrous material between them.

Furthermore, I preferably harden or temper one of the sheets to provide a wear-resisting surface in contact with the face of the gears.

Also, when punching the sheets, I preferably shape the dies so as to slightly bow or dish the plates. This, when the sheets are bolted with their convex side against the casting, tends to produce a tight joint over the whole area of the plate inside the bolting circle.

Another object of the invention is to improve the efficiency of the pumping action by changing the shape, size and location of the conventional ports. To this end I divide the inlet port into two elongated parts, both lying on the same arc, but separated by a substantial distance. The outlet port is also arcuate and lies on the opposite side of the center line from the inlet port, but its end nearest the center line is further away from the center line than is the corresponding end of the inlet port. This arrangement has the advantages hereinafter described in detail.

With the above and other objects in view, and to improve generally on the details of pumps of this type, the invention consists in the construction and arrangement of parts hereinafter described and claimed, and illustrated in the accompanying drawings, forming part of this specification, and in which:

FIG. 1 is a side elevation of one embodiment of the invention. FIG. 2 is a section on the line 2—2 of FIG. 1, looking in the direction of the arrows. FIG. 3 is a section substantially on the line 3—3 of FIG. 1 looking in the direction of the arrows, the gear elements being shown in broken lines, for the sake of clearness.

Figure 4:
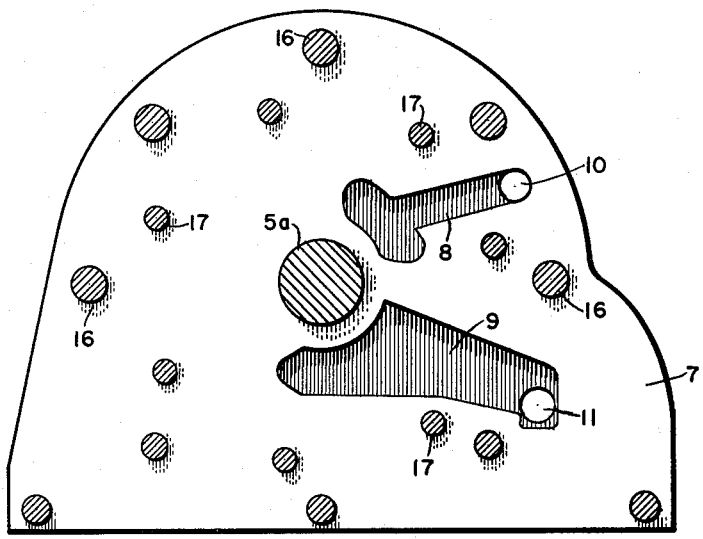
FIG. 4 is a section substantially on the line 4—4 of FIG. 1 looking in the direction of the arrows.

Referring to the drawings in detail my improved rotary pump comprises a housing 1 having a substantially circular recess therein, in which is mounted the pair of gear elements 2 and 3 making up the rotary pump. The gear element 2 is in the nature of an internal ring gear which fits snugly in said recess, and the gear element 3 is in the nature of a pinion which is located within and meshes with the teeth of the internal gear 3.

A crescent shaped partition 4 is interposed between the internal gear and pinion at the side of the pinion opposite the meshing point and serves to divide the space between the gear elements into an intake pocket or compartment $a$ and a delivery pocket or compartment $b$.

Figures 5, 6:
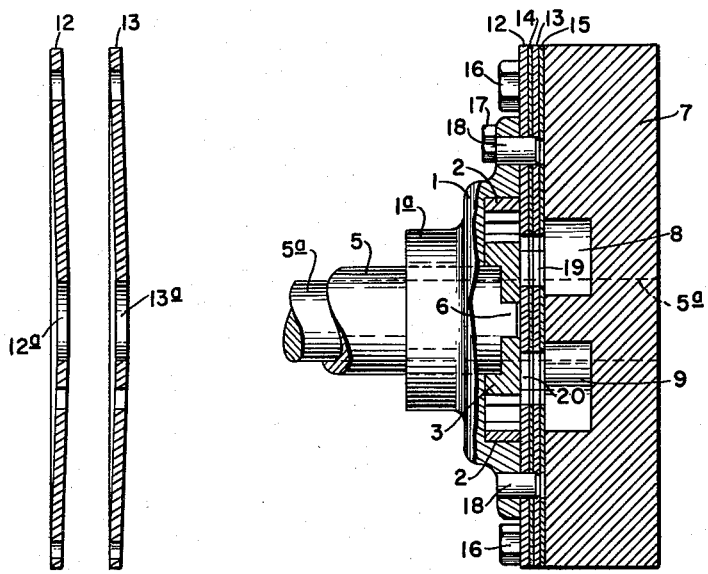
FIG. 5 is a transverse section substantially on the line 5—5 of FIG. 3 looking in the direction of the arrows.
FIG. 6 is a vertical sectional view showing in separated relation the two sheet members hereinafter described.

The pinion 3 is driven by a hollow shaft 5, extending through a bearing collar $1^a$ on the housing 1, and having at its end a pair of tangs 6 which engage in notches in said gear, as shown in FIGS. 2 and 5. This hollow shaft or sleeve 5 fits over and is freely rotatable on a fixed shaft $5^a$, on which the pinion 3 turns.

In addition to the housing 1 and associated parts above described the pump comprises a casting 7 having outlet and inlet ducts 8 and 9 formed therein, these ducts communicating with pipes 10 and 11 extending from the outside of the casting. The fixed shaft $5^a$ is rigidly set in this casting, as shown in broken lines in FIGS. 1 and 5.

It will be understood that the face of the housing 1 around the edge of the recess in which the gear elements are mounted has a machined surface, and that the end faces of the gear elements and of the partition 4 are also machined and lie in the plane of this surface.

Similarly, the inner face of the casting 7 has a machined surface, shown in FIG. 4, and the ducts 8 and 9 open through this surface.

Interposed between the machined surfaces of the housing 1 and its associated parts, and the casting 7, is a plate structure made up of a pair of relatively thin sheet members 12 and 13, and a pair of similarly shaped gaskets 14 and 15, of relatively soft material.

This plate structure comprising the two sheet members and the two similarly shaped gaskets are provided around the edges with bolt holes through which pass bolts 16, serving to hold the plates and gaskets in assembled relation against the face of the casting 7. The sheet members 12 and 13 also have openings $12^a$ and $13^a$ respectively, to fit over the fixed shaft $5^a$.

The housing 1 also has a series of bolt holes around its periphery and a series of bolts 17 pass through these bolt holes into threaded sockets in the casting 7, thus clamping the housing and the casting tightly together with the above described plate structure interposed between them.

In order to aid in assembling the parts, a pair of diametrically opposite studs 18 are preferably secured to the housing 1. These studs fit into holes formed in the plate structure, as shown in FIGS. 2 and 3.

The plate structure described is formed with an outlet port 19 registering with the duct 8, and with inlet ports 20 and 21 registering with the duct 9 (see FIG. 3).

It will be observed that there are two inlet ports 20 and 21 spaced apart a substantial distance as indicated at $21^a$ and disposed on an arc covering the enlarged inner end of the inlet duct 9, and also over-lying the intake pocket or compartment of the pump formed by one tip of the crescent shaped partition 4 and the meshing point of the gear elements.

Similarly, the outlet port 19 is of arcuate shape and registers with the enlarged inner end of the outlet duct 8 and overlies the associated delivery pocket or compartment of the pump between the opposite end of the crescent shaped partition and the meshing point of the gear elements.

It will further be noted that if a line be drawn through the center of the pinion 3 and the center of the meshing point of the gear elements, the end of the outlet port 19 adjacent this center line lies further away from such line than the adjacent end of the inlet port. Thus, a greater oil pressure tends to build up in this area than would otherwise be the case, thus assuring adequate lubrication for the end faces of the gear elements.

It will be seen that the end faces of the gear elements are in contact with the sheet member 12, and in order to minimize wear and maintenance costs this sheet member 12 is preferably made of hardened wear-resisting steel. The other sheet member 13 may be of milder steel.

By reference to FIG. 6 it will be seen that both of these sheet members 12 and 13 are slightly bowed or dished in such a manner that their convex sides, when nested in assembled relation bear against the face of the casting 7 thus insuring a very close contact between the plate structure and such casting, especially over the area of the ports and ducts, thus ensuring against leakage which might well occur if the sheet members were flat.

It will be understood that these sheet members 12 and 13 are of such relatively thin gauge that they may be formed by means of a die-pressing or punching operation, thus avoiding the cost of expensive milling or machining, and when these sheet members are assembled as described they form a plate structure of adequate thickness and rigidity.

What I claim is:

1. A rotary pump comprising a housing having a recess opening at a machined end surface, a pair of internally meshing gears mounted in said recess and forming therewith and with each other intake and delivery pumping compartments, the end faces of said gears lying flush with said machined end surface, means for driving one of said gears, a casting having inlet and outlet ducts and also having a machined surface through which said ducts open, and a compound plate structure interposed between said machined surfaces completing said pumping compartments and having inlet and outlet ports registering with said ducts and communicating with said inlet and delivery pumping compartments, respectively, said compound plate structure being made up of a pair of similarly shaped relatively thin sheet members having a gasket between them extending over their entire area, the face of one of said sheet members bearing against said machined end surface and the end faces of said gears, and the face of the other sheet member bearing against the machined surface of said casting, and means for clamping said housing, plate structure and casting together, whereby a plate structure of adequate thickness and rigidity may be produced by a die punching operation.

2. A pump structure according to claim 1 in which not only is one gasket interposed between said sheet members, but another similar gasket is interposed between said compound plate and the machined surface of said casting, and in which said second gasket has port openings registering with those in said sheet members.

3. A pump structure according to claim 1 in which the sheet member in contact with said gears is formed of hardened, wear-resisting steel, while the other sheet member is of softer material.

4. A pump structure according to claim 1 in which both of said sheet members are slightly dished, and are assembled in nested relation.

5. A pump structure according to claim 1 in which both of said sheet members are slightly dished and are assembled in nested relation with the convex side bearing against said casting in which the ducts are formed.

6. A pump structure according to claim 1 in which both of said sheet members are slightly dished and are assembled in nested relation with the convex side bearing against said casting in which the ducts are formed and in which a series of bolts pass through openings around the edges of said nested sheet members, which bolts, when tightened, serve to flatten said sheet members and secure them against the machined face of said casting in close contact therewith.

References Cited in the file of this patent

UNITED STATES PATENTS

| | | |
|---|---|---|
| 1,938,203 | Witherell | Dec. 5, 1933 |
| 2,277,160 | Shaw | Mar. 24, 1942 |
| 2,433,360 | Haight | Dec. 30, 1947 |
| 2,513,984 | Witchger | July 4, 1950 |
| 2,671,410 | Wahlmark | Mar. 9, 1954 |
| 2,694,367 | Seavey | Nov. 16, 1954 |

FOREIGN PATENTS

| | | |
|---|---|---|
| 449,759 | Canada | July 13, 1948 |